US010262068B2

(12) United States Patent
Gungor et al.

(10) Patent No.: US 10,262,068 B2
(45) Date of Patent: Apr. 16, 2019

(54) SYSTEM, METHOD, AND NON-TRANSITORY COMPUTER-READABLE STORAGE MEDIA FOR DISPLAYING AN OPTIMAL ARRANGEMENT OF FACETS AND FACET VALUES FOR A SEARCH QUERY ON A WEBPAGE

(71) Applicant: Wal-Mart Stores, Inc., Bentonville, AR (US)

(72) Inventors: Onur Gungor, Sunnyvale, CA (US); Manas A. Pathak, Sunnyvale, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 486 days.

(21) Appl. No.: 14/841,332

(22) Filed: Aug. 31, 2015

(65) Prior Publication Data
US 2017/0061015 A1   Mar. 2, 2017

(51) Int. Cl.
G06F 7/00 (2006.01)
G06F 17/30 (2006.01)
G06N 7/00 (2006.01)

(52) U.S. Cl.
CPC .... *G06F 17/30867* (2013.01); *G06F 17/3053* (2013.01); *G06F 17/30489* (2013.01); *G06F 17/30598* (2013.01); *G06N 7/005* (2013.01)

(58) Field of Classification Search
CPC ............................................. G06F 17/30867
See application file for complete search history.

(56) References Cited

U.S. PATENT DOCUMENTS

2011/0055238 A1* 3/2011 Slaney .............. G06F 17/30657
707/759
2012/0030152 A1* 2/2012 Pueyo ............... G06F 17/30867
706/12
2016/0026643 A1* 1/2016 Desai .................. G06F 17/3053
707/727

* cited by examiner

*Primary Examiner* — Jeff A Burke
*Assistant Examiner* — Dawaune A Conyers
(74) *Attorney, Agent, or Firm* — Bryan Cave Leighton Paisner LLP

(57) ABSTRACT

A system for displaying facets on a webpage includes a processor executing an algorithm for estimating a probability of a user selecting a particular facet and facet value for the search query, estimating a probability of the user selecting an item given the particular facet and facet value have been selected, filtering facets and facet values to remove duplicate and/or irrelevant facets and/or facet values, ranking facets and facet values such that mutual information between the item and facets and facet values is maximized, and establishing a dynamic expansion or a dynamic demotion for the plurality of facets and the plurality of facet values. A method and one or more non-transitory computer-readable storage media for displaying an optimal arrangement of facets and facet values for a search query on a webpage are also disclosed.

20 Claims, 4 Drawing Sheets

SYSTEM, METHOD, AND NON-TRANSITORY COMPUTER-READABLE STORAGE MEDIA FOR DISPLAYING AN OPTIMAL ARRANGEMENT OF FACETS AND FACET VALUES FOR A SEARCH QUERY ON A WEBPAGE

FIELD OF THE DISCLOSURE

The present disclosure relates generally to a system, method, and non-transitory computer-readable storage media for displaying an optimal arrangement of facets and facet values for a search query on a webpage of an online shopping service.

BACKGROUND

Online shopping is a form of electronic commerce where products can be bought, purchased, and/or traded online, such as through the Internet, or by using a specially designed application or app resident on the user's computing device such as a personal computer, a tablet, a smartphone, and/or the like. At least some known web hosting systems include search engines that allow users to enter search criteria (e.g., a search query) and to generate search results based on the user's search criteria. Typically, the search engine generates a list of products based on the user's search criteria, and the list of products may be displayed to the user, such as on a webpage or through the specially designed application or app resident on the user's computing device.

For many online shopping services, the webpage or application offers faceted searching to allow the user to narrow initial search results to a more manageable number of search results, which include items that are more on-point and meaningful to the user. For instance, the online shopping service may generate initial search results based on the user's search query entered into the search engine. The initial search results can be narrowed to a more manageable number of search results by selecting one or more facet(s) and/or facet value(s) presented on a left hand navigation (LHN) portion of the webpage.

Since each user and each search query is typically different, one challenge with current online shopping services that utilize faceted searching is that selection and ordering of facets and facet values presented on the LHN portion of the webpage have to be individually optimized. Another challenge with current online shopping services that utilize faceted searching is determining how many facets and facet values to actually display on the webpage for a given search query. In turn, it is also a challenge to determine how many facets and facet values should be demoted; i.e., not actually displayed but accessible by selecting a "see more" link, button, or hyperlink set forth on the webpage. Manual ordering of facets and facet values is typically not feasible due, at least in part, to the large number of users and the large number of search queries entered into the search engine, as well as the generally dynamic nature of the item or product search database.

The present disclosure is aimed at solving the problems identified above.

SUMMARY

In different embodiments of the present disclosure, systems, methods, and computer-readable storage media allow users to enter a search query into a search engine and automatically display an optimal arrangement of facets and facet values for the user's search query on, e.g., a left hand navigation (LHN) portion of the webpage.

In one embodiment of the present disclosure, a system for displaying facets is provided. The system includes a database for storing a plurality of facets and a plurality of facet values and a processor coupled to the database. The processor is configured to execute computer-readable instructions causing the processor to: estimate a first probability of a user selecting a particular facet of the plurality of facets and a particular facet value of the plurality of facet values for the given search query; estimate a second probability of the user selecting an item given the particular facet and the particular facet value have been selected; filter the plurality of facets and the plurality of facet values to remove duplicate facets, duplicate facet values, irrelevant facets, irrelevant facet values, or combinations thereof; rank the plurality of facets such that mutual information between the item and the plurality of facets and the plurality of facet values is maximized; and establish a dynamic expansion or a dynamic demotion for the plurality of facets and the plurality of facet values.

In another embodiment of the present disclosure, a method of displaying facets is provided. The method includes one or more steps which is/are performed utilizing a processor executing computer-readable instructions of a computer program. The method comprises the step of estimating a first probability of a user selecting a particular facet of the plurality of facets and a particular facet value of the plurality of facet values for the given search query. The method further comprises the step of estimating a second probability of the user selecting an item given the particular facet and the particular facet value have been selected. The method further comprises the step of filtering the plurality of facets and the plurality of facet values to remove duplicate facets, duplicate facet values, irrelevant facets, irrelevant facet values, or combinations thereof. The method further comprises the step of ranking the plurality of facets and the plurality of facet values such that mutual information between the item and the plurality of facets and the plurality of facet values is maximized. The method further comprises the step of establishing a dynamic expansion or a dynamic demotion for the plurality of facets and the plurality of facet values.

In another embodiment of the present disclosure, one or more non-transitory computer-readable storage media having computer-executable instructions embodied thereon is provided. The computer-readable instructions, when executed by a processor, causes the processor to: estimate a first probability of a user selecting a particular facet of the plurality of facets and a particular facet value of the plurality of facet values for the given search query; estimate a second probability of the user selecting an item given the particular facet and the particular facet value have been selected; filter the plurality of facets and the plurality of facet values to remove duplicate facets, duplicate facet values, irrelevant facets, irrelevant facet values, or combinations thereof; rank the plurality of facets and the plurality of facet values such that mutual information between the item and the plurality of facets and the plurality of facet values is maximized; and establish a dynamic expansion or a dynamic demotion for the plurality of facets and the plurality of facet values.

BRIEF DESCRIPTION OF THE DRAWINGS

Non-limiting and non-exhaustive embodiments of the present disclosure are described with reference to the following figures. Other advantages of the present disclosure will be readily apparent, as the same becomes better understood by reference to the following detailed description when considered in connection with the accompanying drawings wherein:

FIG. 4 is an illustration of an example screenshot from the system of FIG. 1, according to an embodiment of the present disclosure; and FIG. 5 is an illustration of another example of a screenshot from the system of FIG. 1, according to an embodiment of the present disclosure.

Figure 1:
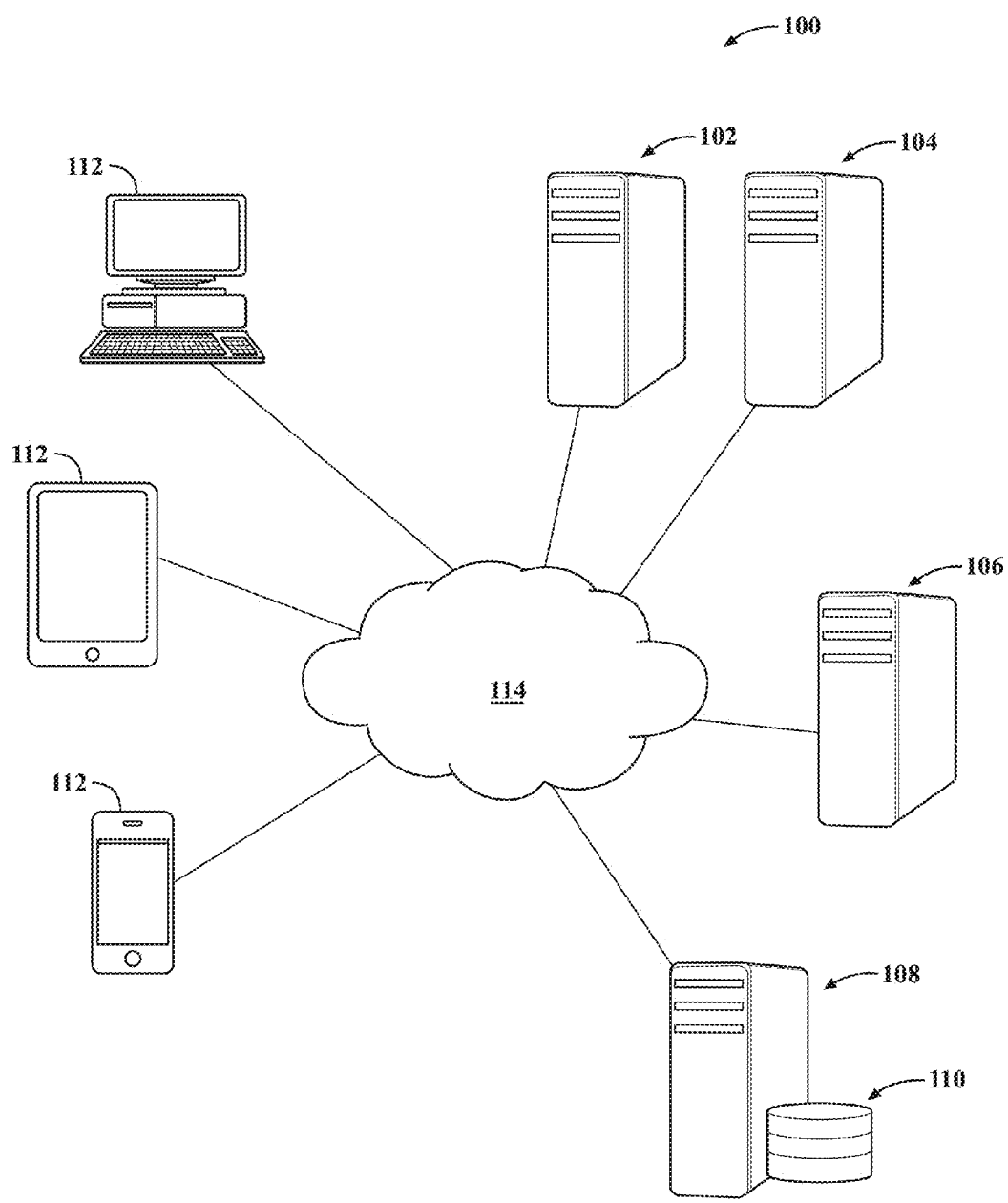
FIG. 1 is a schematic illustrating various aspects of a system, according to the present disclosure.

Corresponding reference characters indicate corresponding components throughout the several views of the drawings. Skilled artisans will appreciate that elements in the figures are illustrated for simplicity and clarity, and have not necessarily been drawn to scale. For example, the dimensions of some of the elements in the figures may be exaggerated relative to other elements to help improve understanding of various embodiments of the present disclosure. Also, common but well-understood elements that are not useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present disclosure. It will be apparent, however, to one having ordinary skill in the art that the specific detail need not be employed to practice the present disclosure. In other instances, well-known materials or methods have not been described in detail in order to avoid obscuring the present disclosure.

Reference throughout this specification to "one embodiment", "an embodiment", "one example" or "an example" means that a particular feature, structure or characteristic described in connection with the embodiment of example is included in at least one embodiment of the present disclosure. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments and/or examples in accordance with the present disclosure may be embodied as an apparatus, method, or computer program product. Accordingly, the present disclosure may take the form of an entirely hardware embodiment, an entirely software embodiment (including firmware, resident software, micro-code, etc.), or an embodiment combining software and hardware aspects that may all generally be referred to herein as a "module" or "system". Furthermore, the present disclosure may take the form of a computer program product embodied in any tangible media or expression having computer-usable program code embodied in the media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisional via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart(s) and block diagram(s) in the flow diagram(s) illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with" or "configured to be in communication with". This terminology is intended to be non-limiting, and where appropriate, be interpreted to include without limitation, wired and wireless communication using any one or a plurality of suitable protocols, as well as communication methods that are constantly maintained, are made on a periodic basis, and/or made or initiated on an as needed basis. The term "coupled" means any suitable communications link, including but not limited to the Internet, a LAN, a cellular network, or any suitable communications link. The communications link may include one or more of a wired and wireless connection and may always be connected, connected on a periodic basis, and/or connected on an as needed basis.

The present disclosure particularly describes how to optimize an arrangement of facets and facet values for display on a webpage of an online shopping service for a given search query. The present disclosure utilizes a computer program to dynamically optimize the arrangement (particularly, a selection and ordering) of facets and facet values for a given search query entered into a search engine of the online shopping service. Said differently, the computer program functions to individually optimize the arrangement of facets and facet values for every search query entered into the search engine.

The optimal arrangement of facets typically includes displaying a selection of facets which are ranked higher than a predefined facet cutoff on a left hand navigation (LHN) portion of the webpage. The optimal arrangement of facets also includes an ordering of the higher ranked facets starting with the highest ranked facet in a first position, the next highest rank in a second position, and so on. In an example, at least two selected facets are displayed in the LHN portion of the webpage. It is to be appreciated, however, that any number of selected facets (e.g., three facets, four facets, etc.) may be displayed on the LHN portion of the webpage.

The optimal arrangement of facet values typically includes displaying a selection of facet values for each displayed facet on the LHN portion of the webpage, where the selected facet values are ranked higher than a predefined facet value cutoff. The optimal arrangement of facet values also includes an ordering of the higher ranked facet values starting with the highest ranked facet value in a first position under the respective facet, the next highest rank in a second position under the respective facet, and so on. Facets and facet values ranked lower than the predefined facet cutoff and facet value cutoff, respectively, are typically not displayed on the LHN portion of the webpage. However, the lower ranked facets and/or facet values may be revealed by selecting (such as by a mouse click) a "see more" icon, button, or hyperlink displayed on the LHN portion of the webpage.

In addition, the computer program utilized to optimize the arrangement of facets and facet values for each search query takes into account facets and facet values where popularity data (e.g., facet click data and facet value click data) is readily available, newly created facets and facet values where popularity data does not exist yet, and tail queries where popularity data is sparse.

Display of the optimal arrangement of facets and facet values for a given search query on, e.g., the LHN portion of the webpage allows a user (such as a consumer) to easily and efficiently navigate through many (e.g., tens, hundreds, or even thousands) products in order to locate a particular product. Easy and efficient navigation through the products increases product engagement and, therefore, increases the likelihood that the consumer will purchase the product. This, in effect, can increase revenue for the eCommerce or online shopping service.

With reference to the figures and in operation, the present disclosure provides a system 100, methods and computer product media that facilitate displaying an optimal arrangement of facets and facet values for a given search query on a webpage of an online shopping service. Referring to FIG. 1, an example of an environment in which the system 100 operates is illustrated. In the illustrated embodiment, the system 100 is configured to enable a user to access a website with one or more user computing devices to view information indicative of products that may be purchased by the user via the website. The system 100 generates and displays, on the LHN portion of a webpage of the online shopping service, selected facets which are ranked higher than a facet cutoff and selected facet values which are ranked higher than a facet value cutoff for a given search request.

For clarity in discussing the various functions of the system 100, multiple computers and/or servers are discussed as performing different functions. These different computers (or servers) may, however, be implemented in multiple different ways such as modules within a single computer, as nodes of a computer system, etc. The functions performed by the system 100 (or nodes or modules) may be centralized or distributed in any suitable manner across the system 100 and its components, regardless of the location of specific hardware. Furthermore, specific components of the system 100 may be referenced using functional terminology in their names. The functional terminology is used solely for purposes of naming convention and to distinguish one element from another in the following discussion. Unless otherwise specified, the name of an element conveys no specific functionality to the element or component.

In the illustrated embodiment, the system 100 includes a website host server 102, a search engine server 104, a sorting server 106, a database server 108, a database 110, and one or more user computing devices 112 each coupled in communication via a communications network 114. The communications network 114 may be any suitable connection, including the Internet, file transfer protocol (FTP), an Intranet, LAN, a virtual private network (VPN), cellular networks, etc. Further, the communications network 114 may utilize any suitable or combination of technologies including, but not limited to, wired and wireless connections, always on connections, connections made periodically, and connections made as needed.

The user computing device 112 may include any suitable device that enables a user to access and communicate with the system 100 including sending and/or receiving information to and from the system 100 and displaying information received from the system 100 to a user. For example, and in one embodiment, the user computing device 112 may include, but is not limited to, a desktop computer, a laptop or notebook computer, a tablet computer, a smartphone/tablet computer hybrid, a personal data assistant, a handheld mobile device including a cellular telephone, and the like.

The database server 108 includes a memory device connected to the database 110 to retrieve and store information contained in the database 110. The database 110 contains, for example, information pertaining to webpages associated with one or more websites, customer account information, product records, and/or any suitable information that enables the system 100 to function as described herein. The database 110 further contains information pertaining to the facets (e.g., facets and facet values) to be displayed on a left hand navigation portion of the webpage.

Figures 4, 5:
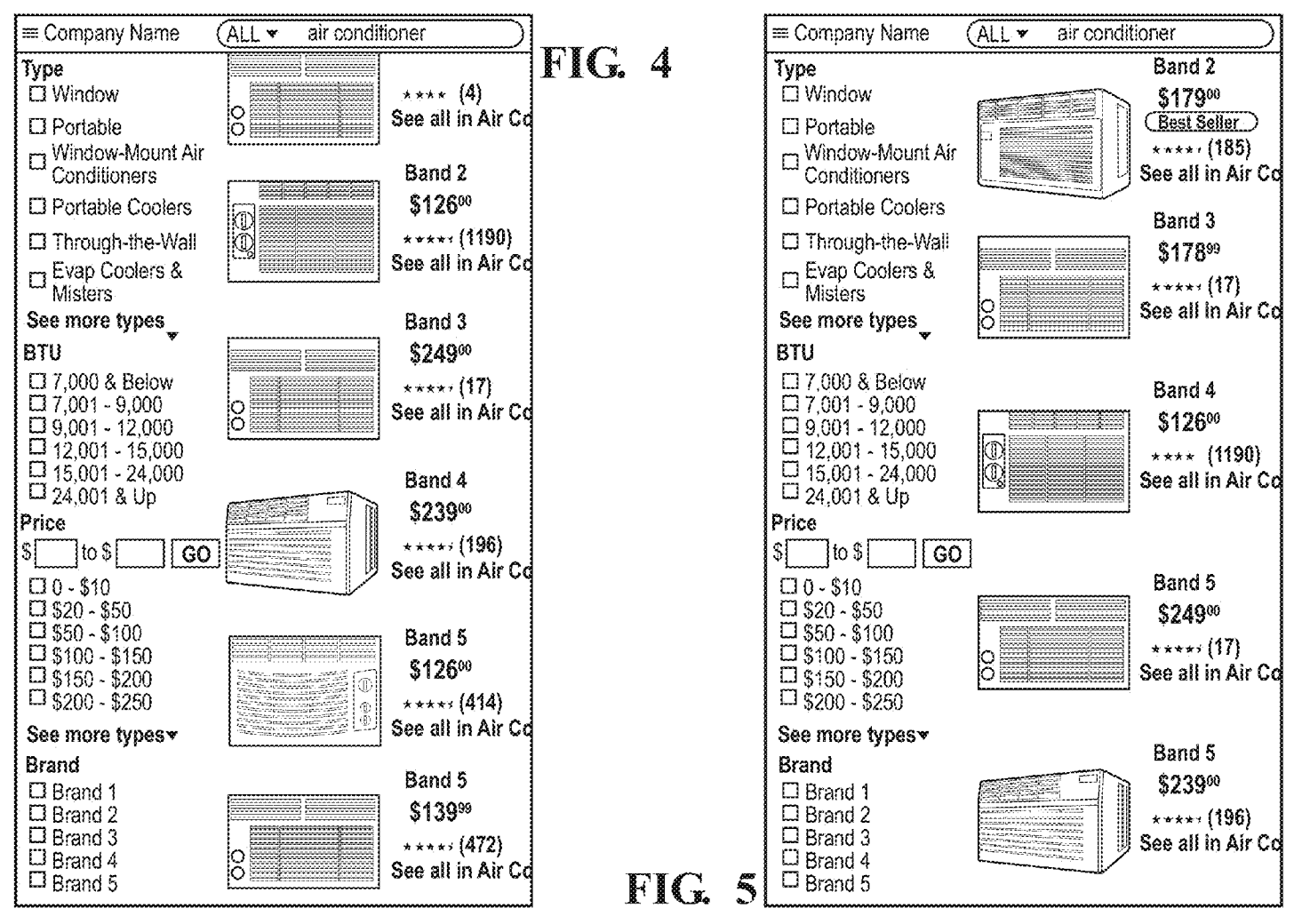

The website host server 102 is configured to host a website 116 (examples of which are shown in FIGS. 4 and 5) that is accessible by a user via one or more user computing devices 112. The website host server 102 retrieves and stores webpages 118 associated with one or more websites 116 in response to requests received from the user via the user computing device 112. The webpages 118 allow users to interact with the website 116 and search and/or purchase products such as, for example, goods and/or services via the website 116. In one embodiment, the website host server 102 is configured to generate and display webpages 118 associated with the website in response to requests being received from consumers via corresponding web browsers that are displayed on the user computing devices 112. For example, the website hosting server 102 may display a product search webpage in response to receiving a user request that allows a user to input a product search request or query including search criteria with one or more search terms. Examples of a website 116 which displays a product search webpage 118 are depicted in FIGS. 4 and 5. In addition, the website host server 102 may transmit the product search request to the search engine server 104 and/or the sorting server 106 for use in generating search data (such as a plurality of product records) in response to the user's search query. The website host server 102 may also receive product record(s) from the search engine server 104 and/or the sorting server 106 that includes information associated with each of the product records selected based on the user's search query. The website host server 102 may also display a search results webpage to display the product records to the user and to allow the user to select one or more of the products associated with the product records for purchase.

The search engine server 104 is configured to receive a product search query from the website host server 102 including one or more search terms and to generate search data including a plurality of product records as a function of the search terms. For example, the search engine server 104 may initiate a search algorithm based on a Boolean model to search product records contained in the database 110 based on the search terms set forth in the user's product search query.

Figure 2:
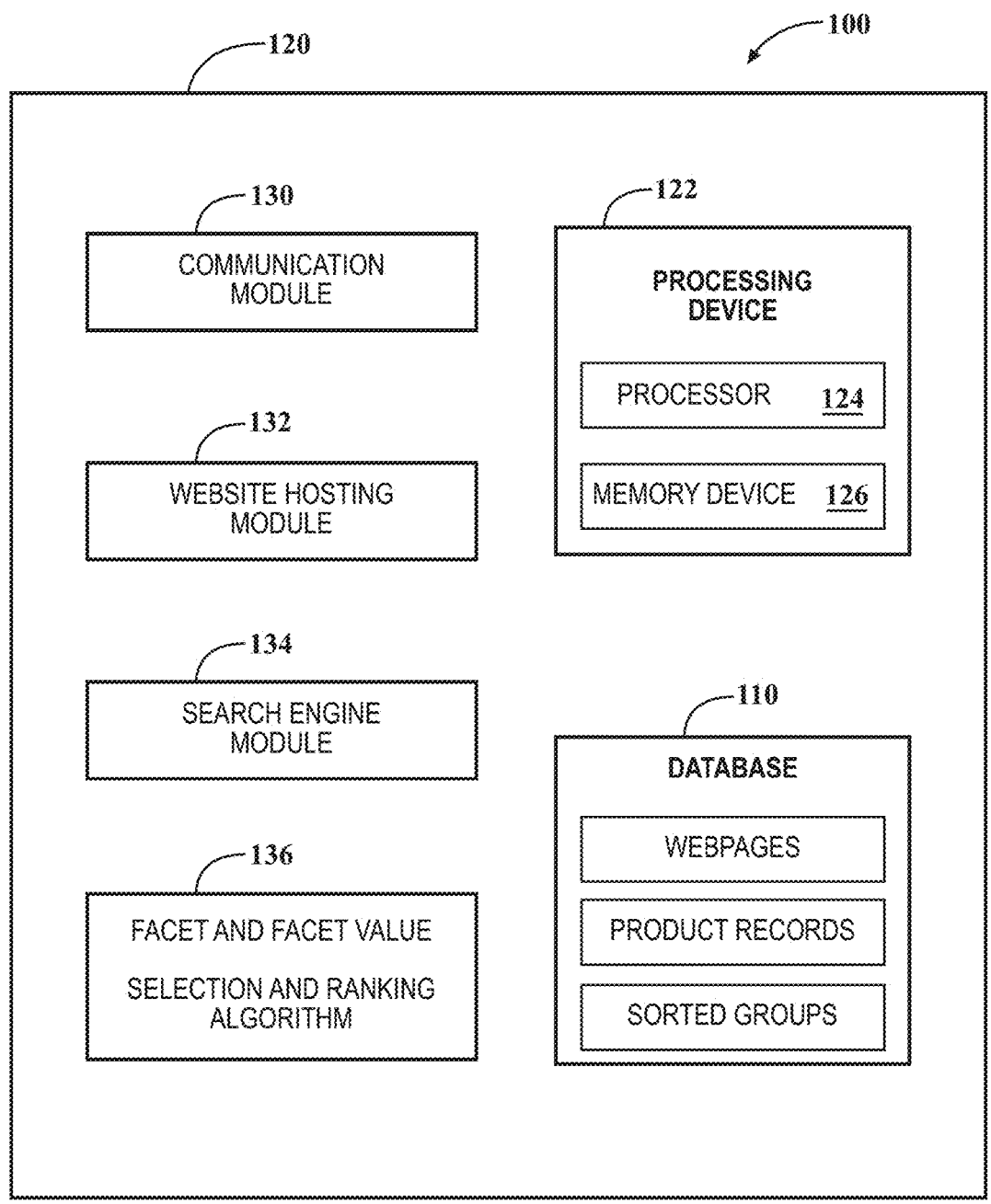
FIG. 2 is a schematic illustrating example components of a server, according to an embodiment of the present disclosure.

Referring to FIG. 2, and in an embodiment, the system 100 may include a system server 120 configured to perform the functions of the website host server 102, the search engine server 104, the sorting server 106, and the database server 108. As shown, the system server 120 includes a processing device 122 and the database 110.

The processing device 122 executes various programs, and thereby controls components of the system server 120 according to user instructions received from the user computing device 112. The processing device 122 may include a processor or a plurality of processors 124 and a memory device 126. The processor(s) 124 may be a controller, a microcontroller, a microprocessor, an application specific integrated circuit (ASIC), or a processor working in conjunction with a central processing unit (CPU) performing the function of a general purpose computer. The processor 124 is configured to execute computer programs containing computer-readable and executable instructions for performing one or more steps of the method for displaying an optimal arrangement of facets and facet values on a webpage of an online shopping service. In an example, the processor 124 is configured to execute a computer program containing computer-readable and executable instructions for performing all of the steps of a method for displaying an optimal arrangement of facets and facet values on a webpage of an online shopping service. The memory device 126 may include a read only memory (ROM) and random access memory (RAM) for storing the computer-readable instructions for performing the step(s) of the method. In embodiments where the processing device 122 includes two or more processors 124, the processors 124 can operate in parallel or distributed manner. In an example, the processing device 122 may execute various modules of the system 100.

The memory device 126 may be configured to store programs and information in the database 110, and retrieving information from the database 110 that may be used by the processor 124 to perform various functions described herein. The memory device 126 may include, but is not limited to, a hard disc drive, an optical disc drive, and/or a flash memory drive. Further, the memory device 126 may be distributed and located at multiple locations.

The communications module 130 retrieves various data and information from the database 110 and sends information to the user computing device 112 via the communications network 114 to enable the user to access and interact with the system 100. In an embodiment, the communications module 130 displays various images on a graphical user interface of the user computing device 112, such as by using computer graphics and image data stored in the database 110 including, but not limited to, webpages, product records, sorted groups, product lists, and/or any suitable information and/or images that enable the system 100 to function as described herein.

The website hosting module 132 may be programmed to perform some or all of the functions of the website host server 102 including hosting various webpages associated with one or more websites that are stored in the database 110 and that are accessible to the user via the user computing device 112. The website hosting module 132 may be programmed to generate and display webpages associated with a website in response to requests being received from users via corresponding web browsers.

The search engine module 134 may be programmed to perform some or all of the functions of the search engine server 104 including generating and storing search data in response to the user's product search request (e.g., the user's search query).

The facet and facet value selection and ranking module 136 is a multi-stage algorithm executable by the processing device 122 for performing the various steps of the method of the present disclosure. The multi-stage algorithm of the module 136 is described in detail below.

Examples of a method for displaying an optimal arrangement of facets and facet values on a webpage of an online shopping service are described below with reference to FIGS. 3-5. The method utilizes a computer program which includes a multi-stage algorithm to optimize the arrangement of facets and facet values on the webpage 118. The multi-stage algorithm may be used to perform left hand navigation (LHN) optimization from an information theoretic prospective, and the multi-stage algorithm inquires what the optimal arrangement of facets and facet values may be for a given search query noting that just about every user and every search query is typically different. The optimal arrangement of facets and facet values occurs when product information based on facets and facet values for a particular product search query is maximized. This means that the facets and facet values of the optimal arrangement displayed on the LHN portion 119 (shown in FIGS. 4 and 5) of the webpage for the particular product search query is a compressed version of the overall search results (e.g., a total number of products retrieved based on a given search query) and provides suitable information (such as, e.g., a brief summary) about the product that the user is interested in based on the product search query.

Figure 3:
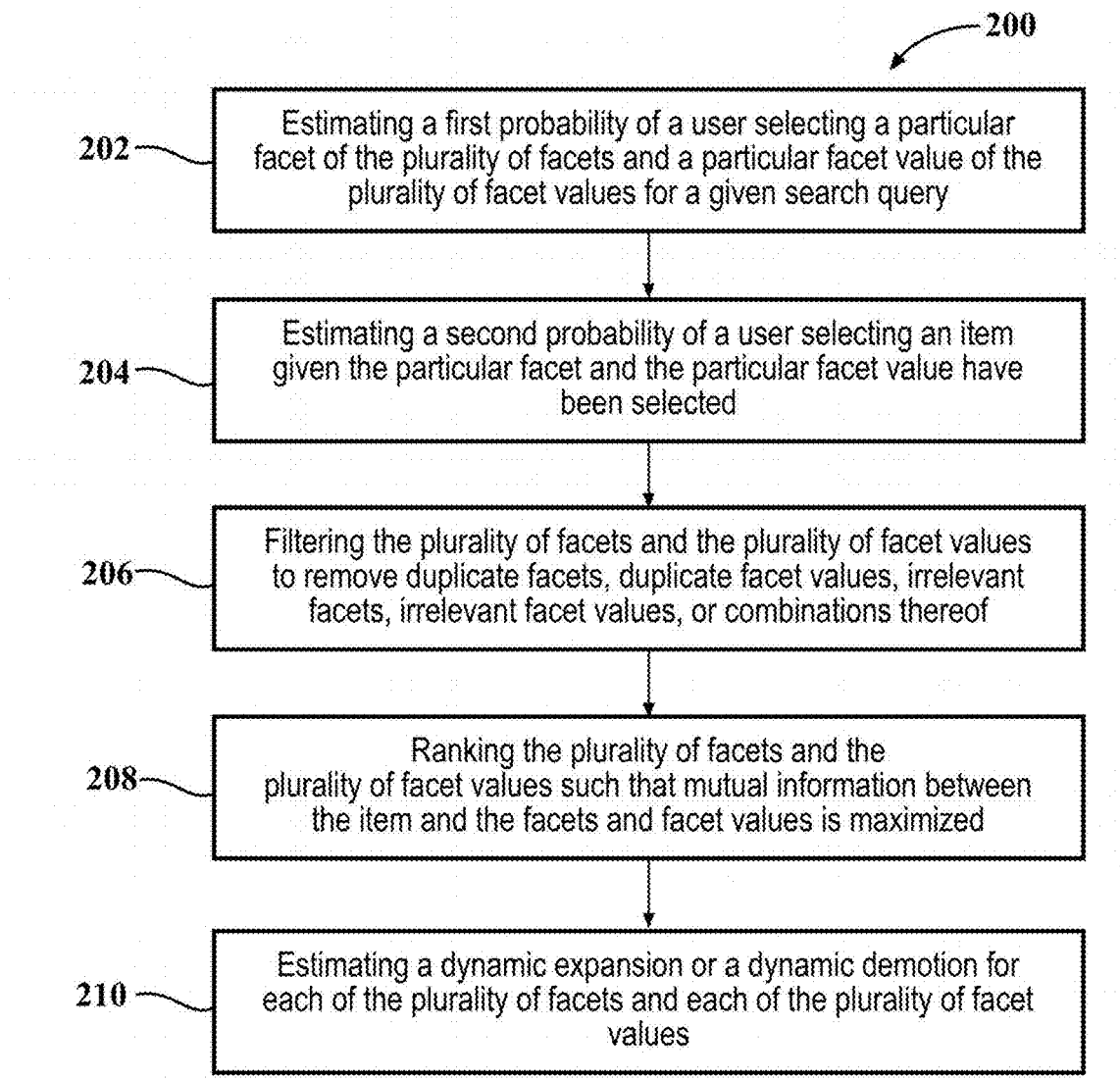
FIG. 3 is a flowchart of a method that may be used with the system shown in FIG. 2, according to an embodiment of the present disclosure.

FIG. 3 is a flow diagram illustrating an embodiment of the method 200 for displaying an optimal arrangement of facets and facet values on a webpage for a given search query. The method includes estimating a first probability of a user selecting a particular facet of the plurality of facets and a particular facet value of the plurality of facet values for the given search query (see 202 in FIG. 3), estimating a second probability of the user selecting an item given the particular facet and the particular facet value have been selected (see 204 in FIG. 3), filtering the plurality of facets and the plurality of facet values to remove duplicate facets, duplicate facet values, irrelevant facets, irrelevant facet values, or combinations thereof (see 206 in FIG. 3), ranking the plurality of facets and the plurality of facet values such that mutual information between the item and the plurality of facets and the plurality of facet values is maximized (see 208 in FIG. 3), and establishing a dynamic expansion or a dynamic demotion for the plurality of facets and the plurality of facet values (see 210 in FIG. 3).

Details of the method 200 for displaying an optimal arrangement of facets and facet values on a webpage for a given search query are described below. For the equations described below with reference to the various steps of the method, the following notation will be used. First, upper case letters such as "F" denote random variables, whereas calligraphic letters such as "$\mathscr{F}$" denote the random variable's alphabet and lower case letters "f" denote the random variable's realizations. Second, probability mass function of a random variable "F" is denoted as $p_F(f)$, where the capital letter is dropped when it is clear from the context, e.g., $p(f)=p_F(f)$. Third, the terms H(F), H(X|F), and I(X;F) denote entropy, conditional entropy, and mutual information of the random variables, respectively. Fourth, the term "1(.)" is the indicator function, which equals to 1 (one) if the statement inside is correct, and 0 (zero) otherwise. Additional variable and/or notation is set forth in Table 1 below:

TABLE 1

Variables and/or Notation

| Variable | Description |
|---|---|
| i | facet index |
| j | facet value index |
| $f_{ij}$ | facet value |
| $f_{i0}$ | null facet value, indicating no selection |
| $F_i$ | random variable; facet value engagement in facet i |
| $\psi_i(x)$ | faceting function, maps item x to facet value(s) of i |
| $\mu(n)$ | facet ranking, that assigns a facet to a position n |
| $\mu^{-1}(i)$ | rank of facet i |
| $\mu_i(n)$ | facet value ranking, maps a position to facet value |
| $\mu_i^{-1}(j)$ | local rank of facet value $f_{ij}$ |
| $\phi$ | number of facets returned on page load |
| $\phi_i$ | number of facet value expanded for facet i |
| $\gamma$ | set of ranking and cutoff functions, [$\mu$, $\phi$, {$\mu_i$, $\phi_i$}] |
| $\rho_{ij}$ | global position of facet value $f_{ij}$, determined from $\gamma$ |
| $\eta_{ij}$ | indicates whether facet value $f_{ij}$ is expanded on page load, determined from $\mu_i$, $\phi_i$ |
| $\alpha_{ik}$ | fixed facet value position bias (see eq. (6)) |
| $\beta_i$ | fixed facet value demotion bias (see eq. (6)) |

A theoretical model of facets for faceting searching on a webpage will now be described. The variable "X" denotes the search index, where x∈X denotes an item in the index, and |X| is the number of items in the search index. The possible search queries are denoted by the variable "Q". An average user types a search query "q" with the probability p(q), and due to the search-ranking function and user intent, the user may engage with the item "x" with the probability p(x|q). It is to be appreciated that item engagement typically depends on the search ranking function as well; however, for purposes of simplicity, it is assumed that the search ranking function is fixed.

The facets may be constructed as follows. It is assumed that there are K>0 facets, where facet i∈{1, . . . , K} contains the facet values $\mathscr{F}_i$={$f_{ij}$, j∈{0, 1 . . . $K_{ij}$}} for some fixed $K_i$>0. Here, $f_{ij}$ is the j'th facet value of the i'th facet and $K_i$>0 is the number of facet values that belong to the facet i.

Further, mapping "$\psi_i$," may be used to map or tag every item to one or more facet values for every facet i; i.e., $\psi_i(x)$={$f_{ij}$}. It is to be appreciated that for every facet i, there exists an artificial null facet value "$f_{i0}$" that is tagged or mapped to every item in the index. Accordingly, selecting a null facet value typically has no filtering affect on the search results and the facet value is not displayed to the user. Further details of filtering are described below.

In addition, on a search page, facets typically work as follows. When a user types a query "q", the facets are displayed in the LHN portion of the webpage, as shown in FIG. 4. When a user selects or clicks on a facet value $f_{ij}$, the search results are restricted to the items that map to the facet value; i.e., x:$\psi_i(x)=f_{ij}$. In instances where the user does not select any facet value of the facet i, it is assumed that for this facet, the user has chosen the imaginary facet value "$f_{i0}$" which does not have any affect of the search results.

In addition, and as shown in the LHN portion 119 in FIGS. 4 and 5, the facets and facet values have a certain order. The ordering typically affects the engagement by the user, as the facets and facet values near the top of the LHN portion of the webpage would like be engaged more due to position bias. It is to be appreciated that the ranking (i.e., ordering) of each facet and facet value is unique for each search query "q"; however, the ranking functions described below omit the search query "q" for purposes of simplicity.

The facet ranking function $\mu:\{N^+ \rightarrow \{0, 1, \ldots, K\}\}$ assigns a position to a facet. For instance $\mu(5)=3$ indicates that facet 3 is shown in the top fifth position of the LHN portion of the webpage. The inverse of this mapping is the ranking of the facet, and "$\mu^{-1}(i)$" denotes the position of facet i.

The facet value ranking function $\mu_i:\{N^+ \rightarrow \{0, 1, \ldots, K\}\}$ assigns a position to a facet value. For instance, $\mu_1(3)=2$ indicates that facet value $f_{12}$ of facet 1 is displayed in the third position. The inverse of this mapping is the ranking of the facet value, and "$\mu^{-1}(j)$" is the position of the facet value $f_{ij}$.

The facet count $\phi$ denotes how many facets are returned for the search query. For example, if the facet count $\phi$=5, then only the top five facets are displayed.

The facet value cutoff $\phi_i$ denotes how many facet values are displayed on the LHN portion of the webpage. For instance, if the facet value cutoff $\phi_i$=4, then the top four facet values of the facet i are displayed on the LHN portion of the webpage. The remaining facet values (i.e., those that fall out of the top four) are demoted.

During a first stage of the algorithm, the method involves estimating a first probability of the user selecting a particular facet and a particular facet value for a given search query (see 202 in FIG. 4) and estimating a second probability of the user selecting an item given the particular facet and facet value have been selected (see 204 in FIG. 4). The first and second probabilities may be estimated utilizing session level data. The session level data may be collected and stored in the database 110 for a plurality of previous search queries. For instance, data may be collected for each search query entered into a search engine, including facet clicks, facet value clicks, and item clicks. The facet clicks from previous search queries may be stored in the database 110 as facet click history. The facet value clicks from previous search queries may be stored in the database 110 as facet value click history. Further, item clicks from previous search queries may be stored in the database 110 as item click history. Data that may also be collected and recorded include the click through rate of facet values as a function of facet value position, facet value expansion, and facet value demotion.

Also collected and recorded is the click through rate of items in search. Examples of datasets of session level data collected and stored in the database 110 are set forth in Tables 2 and 3 below. These particular examples are datasets for TV's.

facet value position bias $\alpha_{ij}$ and the fixed facet value demotion bias $\beta_i$ may be applied as follows. For each search query "q", the click-through rate for the facet value, i.e., $ctr(f_{ij}|\rho_{ij}=k, \eta_{ij}=l, q)$ is recorded for every facet and facet value $f_{ij}$, facet value global position $\rho_{ij}$, and the fact (regard-

TABLE 2

Example Dataset of Facet Click Data for TV's

| facet (i) | facet value ($f_{ij}$) | global position ($\rho_{ij}$) | expanded ($\eta_{ij}$) | impressions | clicks | click-through-rate ($ctr(f_{ij}|\rho_{ij}, \eta_{ij})$) |
|---|---|---|---|---|---|---|
| display | LED TV's | 15 | true | 1500 | 15 | 0.01 |
| display | LED TV's | 21 | true | 1000 | 8 | 0.008 |
| display | 3D TV's | 24 | true | 850 | 22 | 0.025 |
| display | 3D TV's | 28 | false | 850 | 9 | 0.01 |

TABLE 3

Example Dataset of Item Click Data for TV's

| item (x) | impressions | clicks |
|---|---|---|
| 42" Samsung LED TV Year 2015 | 25000 | 242 |
| 50" VIZIO 3D TV Year 2014 | 26000 | 198 |
| 55" RCA 4K TV Year 2015 | 29000 | 222 |

In an embodiment, the database 110 may also store tables which map facets to a particular item. For instance, the tables may be constructed, by the processor, by tracking facets and facet values which are available for every item. Item attributes and attribute values may be sued as input to construct all possible facets and facet values for the item. The facet-item mapping table for each item typically includes all possible facets and facet values for the item. An example of an item-facet mapping table for TV's is set forth in Table 4:

TABLE 4

Example Item-Facet Mapping Table for TV's

| item (x) | facet (i) | facet value ($f_{ij}$) |
|---|---|---|
| 42" Samsung LED TV Year 2015 | display | LED |
| 42" Samsung LED TV Year 2015 | tv screen size | 40-49" |
| 42" Samsung LED TV Year 2015 | brand | Samsung |

It is to be appreciated that, in some instances, the item-facet mapping table may include duplicate and/or irrelevant facets and facet values. These duplicate and/or irrelevant facet and facet values may be removed during the filtering step of the method described in further detail below.

The step of estimating the first probability of a user selecting a particular facet and facet value for a given search query takes into account a fixed facet value position bias $\alpha_{ij}$ and a fixed facet value demotion bias $\beta_i$. The fixed value position bias $\alpha_{ij}$ represents facet values at lower positions which are likely to be engaged less due, at least in part, to more user effort is required (e.g., the user must scroll down to view the facet values at lower positions). The fixed facet value demotion bias $\beta_i$ represents facet values demoted to below the "see more" link or button which are likely to be engaged less due, at least in part, to the facet values being hidden on the webpage and requiring more user effort (e.g., the user must click on the "see more" button to view the demoted facet values). The fixed facet value position bias $\alpha_{ij}$ and the fixed facet value demotion bias $\beta_i$ may be estimated by applying a linear model to the facet click data stored in the database 110. The linear model for estimating the fixed less of whether the facet value is expanded or demoted $\eta_{ij}$). It is to be appreciated that the query parameter q is included in this estimation, because the facet value position and demotion bias is assumed to be the same globally; i.e., a different model is not fitted per search query. Accordingly, information across all of the search queries can be used to estimate the fixed facet value position bias $\alpha_{ij}$ and a fixed facet value demotion bias $\beta_i$.). Then, for any facet value indices i,j, the facet value global position k, and facet expansion indicator l∈{0,1}, the position bias parameter $\alpha_{ik}$ and demotion bias parameter $\beta^i$ is selected that minimizes a minimum mean square error expression. The minimum mean square error expression (i.e., MMSE estimator) is shown in Equation (1):

$$\min_{\alpha_{ik}, \beta_i} \sum_q |ctr(f_{ij}|\rho_{ij}=k, \eta_{ik}=l, q) - \alpha_{ik} * \beta_i^{(1-l)} * ctr(f_{ij}|\rho_{ij}=1, \eta_{ik}=1, q)|^2 \quad \text{Equation (1)}$$

where $\beta_i^{(1-l)}$ is $\beta_i$ raised to the power 1−l (meaning $\beta_i$ is 1 if l=1, which means that the facet value is not demoted and, hence, no demotion bias) and $\beta_i$ otherwise.

The first probability of a user selecting a particular facet and facet value (i.e., the facet value engagement) for a given search query may be estimated as follows. To estimate the first probability, the method involves combining facet click engagement data and item click engagement data with indirect signals, such as click engagement of items that a facet value is mapped to. The indirect signals are used in the program so that recently created facets and facet values that do not have any click data or history are taken into account. With indirect signals, the program can rank the newly created facets and facet values so that the newly created facets and facet values show up on the LHN portion of the webpage. Indirect signals may also be used by the program to account for tail queries, where facet click data is typically sparse.

Estimation of the first probability also requires a number of assumptions for purposes of simplifying the estimation. First, it may be assumed that facets are independent. More particularly, it may be assumed that duplicate facets are filtered out before the facets are ranked and the remaining facets and facet values are independent as described by Equation (2):

$$I\left(X; F_1, \ldots, F_K | \gamma\right) = \sum_{i=1}^{K} I(X; F_1 | \gamma) \quad \text{Equation (2)}$$

Second, it may be assumed that facet value position and demotion biases are fixed. More particularly, the global position of a facet value $f_{ij}$ on the LHN portion of the webpage on the local position under facet i, the position of facet i and the number of facet values expanded in facets above facet i. Accordingly, the global position of may be expressed by Equation (3):

$$\rho_{ij} = \sum_{n=1}^{\mu^{-1}(i)-1} \phi_{\mu(n)} + \mu_i^{-1}(j) \qquad \text{Equation (3)}$$

It is to be appreciated that the facet value $f_{ij}$ is expanded or demoted may be determined by the position of the facet value and the number of facet values expanded, which is described by Equation (4):

$$\eta_{ij} = 1(\mu_i^{-1}(j) \leq \phi_i) \qquad \text{Equation (4)}.$$

Accordingly, the probability of engaging with a facet value $f_{ij}$ can be expressed by Equation (5):

$$p(f_{ij}|\gamma) = p(f_{ij}|\rho_{ij},\eta_{ij}) \qquad \text{Equation (5)}.$$

In Equation (4), $\gamma$ is a multi-dimensional function that describes the facets and facet values displayed to the user for a compressed set of search results. The set of facet ranking, facet value ranking and dynamic facet expansion functions are described with $\gamma = [\mu, \phi, \{\mu_i, \phi_i\}]$ (as shown in Table 1). As previously described, optimization of the arrangement of the facets and facet values involves obtaining $\gamma$, which maximizes the mutual information between the facet & facet values, and the search results, as expressed by Equation (6):

$$\gamma^* = \underset{\gamma}{\mathrm{argmax}}\, I(X; F_1, \ldots, F_K \mid \gamma). \qquad \text{Equation (6)}$$

Referring back to Equation (4), the probability of a facet value depends on $\gamma$ only through the facet value's global position $\rho_{ij}$, and the fact that it is expanded/demoted $\eta_{ij}$. Further, it may be assumed that for every facet (and search query), the facet value position and demotion affects the facet popularity by a constant scaling factor; i.e., for any facet i, the non-null facet value "j≠0 and position k>0, there exists constants $0 > \alpha_{ik} > 1$, $0 < \beta_i < 1$ to get Equation (7):

$$p(f_{ij}|\rho_{ij}=k_1, \eta_{ij}=0) = \alpha_{ik}\beta_i p(f_{ij}|\rho_{ij}=1, \eta_{ij}=1) \qquad \text{Equation (7)}.$$

It is to be appreciated that the assumption that the facet value position bias "$\rho_{ij}$" depends on the facet and position "$\alpha_{ij}$", and does not depend on the query "q" or facet value "j". This assumption is due to a limitation of data sparsity and to avoid overfitting. Alternatively, the facet value position bias "$\rho_{ij}$" and position "$\alpha_{ij}$" can be estimated per facet value and/or query depending on the sparsity or abundance of the data.

Third, it may be assumed that facet ranking does not affect post-facet click item engagement. More particularly, it may be assumed that the facet position in the LHN portion of the webpage does not affect the probability of engaging with an item in post-click for any facet value "$f_{ij}$" and for any item "x" as shown by Equation (8):

$$p(x|f_{ij},\gamma) = p(x|f_{ij}) \qquad \text{Equation (8)}.$$

Once the foregoing assumptions have been made and the fixed facet position bias "$\alpha_{ik}$" and the demotion bias "$\beta_i$" has been estimated, estimation of the first probability further includes estimating a facet click probability at the first position (i.e., position 1) due to the equality set forth in Equation (6) above. The first probability can then be expressed by Equation (9):

$$p(f_{ij}|\rho_{ij}=k, \eta_{ij}=l) = \qquad \text{Equation (9)}$$

$$\alpha_{ik}(\beta_i)^{1-l} \frac{ctr(f_{ij}|\rho_{ij}=1, \eta_{ij}=1) * imps(f_{ij}) + \sum_{x:f_{ij}\in\psi_i(x)} ctr(x)*imps(x)*\delta}{imps(f_{ij}) + \sum_{x:f_{ij}\in\psi_i(x)} imps(x)*\delta}$$

where $\alpha_{ik}$ is the fixed facet value position bias at global position k>0; $l \in \{0,1\}$ is an indicator of whether facet value is expanded, is the fixed facet value demotion bias (i.e., when facet value is not demoted (l=1), then $(\beta_i)^{1-l}=1$); $f_{ij}$ is the facet value; $\rho_{ij}$ is the global position of the facet value; $\eta_{ij}$ is the indicator that facet value is expanded on the page load; $\psi_i(x)$ is a faceting function which maps item x to the facet values of the item i; $imps(f_{ij})$ is the total facet value impressions over a period of time (e.g., 1 month aggregation); $ctr(f_{ij})$ is the click through rate of the facet value in this period; $imps(x)$ is the total item impressions; $ctr(x)$ is the item click through rate; and $\delta > 0$ is a constant, adjusts the weights of the two terms (which can be tuned offline).

Estimation of the second probability of the user selecting an item given the particular facet and facet value have been selected may be referred to herein as the estimation of post-facet click item engagement. The second probability may be estimated as follows. Due to the assumption that the post-facet click item engagement is independent of ranking, the item engagement (i.e., the second probability) can be estimated utilizing the item click data stored in the database 110 utilizing Equation (10):

$$p(x|f_{ij}) = \begin{cases} \xi * ctr(x), & \text{if } f_{ij} \in \psi_i(x). \\ 0, & \text{otherwise} \end{cases} \qquad \text{Equation (10)}$$

Equation (10) describes the probability of a user engaging (or selecting) an item "x" given the user clicks on the facet value "$f_{ij}$", which is equal to the click-through rate of the item if the facet value is tagged to the item. Otherwise, the probability of the user engaging with the item "x" is zero (0), because the item is filtered out by the search engine. In Equation (10), $\xi$ is a normalizing constant, and $\xi > 0$.

During the second stage of the algorithm, the method involves filtering the facets and facet values to remove duplicate facets, duplicate facet values, irrelevant facets, irrelevant facet values, or combinations thereof (see 206 in FIG. 3). As used herein, a duplicate facet is a facet that is exactly the same as another facet generated by the algorithm. Likewise, a duplicate facet value is a facet value that is exactly the same as another facet value generated by the algorithm. Examples of duplicate facets and facet values are set forth in Table 5 below:

TABLE 5

Examples of Duplicate Facets and Facet Values

| item (x) | facet (i) | facet value ($f_{ij}$) |
|---|---|---|
| 46" Samsung LED TV | screen_size | 46" |
| 46" Samsung LED TV | tv_screen_size | 40-49" |

TABLE 5-continued

Examples of Duplicate Facets and Facet Values

| item (x) | facet (i) | facet value ($f_{ij}$) |
|---|---|---|
| George Women's Classic Career Suiting Pant | clothing type | Women |
| George Women's Classic Career Suiting Pant | gender | Women |

An irrelevant facet is a facet that is not related or relevant to the item that the user is searching for. Likewise, an irrelevant facet value is a facet value that is not related or relevant to the item that the user is searching for. An example of an irrelevant facet may be "laptop screen size" when the user is looking for "television sets". In this case, all of the facet values of "laptop screen size" facet, e.g., '11 to 14 inches', '15 to 16 inches', etc., are irrelevant to the query, since a majority of television sets have screen sizes above 20 inches. Instead, a 'television screen size' facet, which has facet values 'less than 20 inches', '20 to 29 inches', '30 to 39 inches', etc., is more relevant to the query. Another major reason of the irrelevant facet & facet value problem is the irrelevant backfill in the search results. For instance, for a search query "TV", unless the user filters the results down to a specific department/category, not all the search results would be of type 'television sets'. For instance, some TV shows would also be displayed in the search results, although on lower positions. It is possible that facets that are not directly relevant to television sets, e.g., facet="format", facet value "DVD", and facet="rating", facet value="PG-13" can be tagged to these items. As a result, these facets could possibly be displayed for query "TV", although they are not particularly relevant to this query.

In some instances, facets and/or facet values may be both duplicative and/or irrelevant, and are filtered out during the filtering step as well.

Irrelevant and/or duplicate facets and/or facet values can be filtered out during the filtering step according to the following procedure. It is to be appreciated that the duplicative and/or irrelevant facets and facets are filtered prior to ranking because, at the second stage of the algorithm, the facets are assumed to be independent. During the filtering step, duplicative and/or irrelevant facets and/or facet values may be removed utilizing browse categories (also referred to as browse shelves). Typically, an eCommerce or online shopping website has a hierarchy of categories (e.g., Electronics→TV&Video→TV's), where a list of facets are tagged to each category. However, the facets set forth in the categories may not be entirely accurate. Accordingly, the tags are used to remove the set of duplicative and irrelevant facets during the second stage of the algorithm.

The filtering step may be accomplished by the following procedure. First, the step involves identifying duplicate and/or irrelevant facets and facet values that have positive first and second probability estimates. The duplicate and/or irrelevant facets and/or facet values can be pre-identified manually, as the number of facets and facet values is typically on the order of thousands. For example, for the search query "TV", the facet "TV-screen-size" provides meaningful ranges of TV sizes, and a "screen-size" facet provides exact values of TV screen sizes.

During the filtering step, a query categorization sub-algorithm or module may be used to determine dominant categories for each search query. Query categorization may be accomplished as follows. When a new item (or product) is added to a search index, the item may be tagged to one or many categories, either algorithmically or manually. This may be referred to as item-category mapping. For instance, a 2014 model Spectre LED TV can be tagged to the category "Electronics->TV&Video &TV's". To obtain query categorization, click data is logged, and the number of clicks on each item for each search query is recorded over a period of time (e.g., over the past 10 days, the past 30 days, the past 6 months, etc.). In addition to the item-category mapping and the click data, the number of clicks on an item of a given category for a given query is logged and recorded. The number of clicks on the item is also normalized with the total number of clicks for the search query (e.g., for the search query "TV" over the past 30 days, all items may have received 500,000 clicks in total and the items tagged to category "Electronics->TV&Video &TV's" may have been clicked 150,000 times. Accordingly, the clicks received for the item is about 30% of all clicks for the search query. All of the categories that received a percentage of clicks above a certain threshold (such as, e.g., 25%) may be considered to be a dominant category. Accordingly, for the search query "TV", the search query categorization sub-algorithm determines the dominant category as being "Electronics→TV&Video→TV's". While the example above produced a single dominant category, it is to be appreciated that multiple dominant categories can be available for a given search query. For instance, for the search query "shorts", the categories "Clothing->Men's->Men's Bottoms->Men's Shorts" and "Clothing->Women's->Women's Bottoms->Women's Shorts" may be two dominant categories for that search query.

In addition, white and black lists of facets may be obtained from the browse shelf, where such lists include facets that have been manually tagged or mapped to a dominant category. For example, the facet "TV-screen-size" may be tagged to the dominant category "Electronics→TV&Video→TV's"; however the facet "screen-size" is not tagged or mapped to this dominant category. In this example, the facet "screen-size" would be removed as a duplicate facet for the search query "TV". In an embodiment, the dominant category for a search query is located, and the white and black lists are used to pre-select facets to display on the webpage. For example, for screen size, there may be the facets "generic-screen-size", "TV-screen-size", "laptop-screen-size", and "tablet-screen-size". For the search query "TV", using the query-categorization sub-algorithm, the white and black lists are used for the corresponding browse shelf (e.g., "Electronics→TV&Video→TV's") and the appropriate facet is obtained from the white and black lists for display on the LHN portion of the webpage.

After filtering, the method proceeds to the third stage of the algorithm which involves ranking the plurality of facets and the plurality of facet values such that mutual information between the item and the plurality of facets and the plurality of facet values is maximized (see 208 in FIG. 3). During the ranking step, the optimal arrangement of facets and facet values displayed on the LHN portion of the webpage is used to compress the initial search results. The optimal arrangement of facets and facet values include selected facets and facet values with a particular ordering (or ranking) to provide the most valuable and useful information to the user. Further, the facets that provide the most valuable and useful information to the user are those that partition the initial search results as uniformly as possible. For instance, for the search query "women's t-shirts", the facet "size" provides valuable information to the user as it partitions the search results almost uniformly, thereby helping users narrow down the search results. However, for the same search query, the facet "gender" is not as effective, because most of the items would have the gender "women" except for a few irrelevant items that may appear in the initial search results.

During the ranking step, the function γ (which encompasses the set of functions [μ, ϕ, {μ$_i$, ϕ$_i$}] directly drives the facet and facet value engagement, and indirectly drives the item engagement. The function γ, when optimized, produces the optimal arrangement of facets and facet values on the webpage for a given search query. The function γ is expressed by Equation (11):

$$\gamma^* = \arg\max_{\gamma} I(X; F_1, \ldots, F_K | \gamma). \quad \text{Equation (11)}$$

The ranking step may be accomplished utilizing separate sub-algorithms or modules that iteratively optimize the facet ranking, the facet value ranking, and the cutoff (i.e., expansion). Accordingly, the ranking step may be accomplished to optimize the function γ. More particularly, the facet ranking sub-algorithms optimize the functions μ and ϕ, and assumes that the functions μ$_i$ and ϕ$_i$ are fixed. The facet value ranking, on the other hand, optimizes the set functions μ$_i$ and the expansion sub-algorithm optimizes the set functions ϕ$_i$.

The facet ranking may be accomplished according to the following procedure. Assuming that the facet value ranking and expansion functions μ$_i$ and ϕ$_i$ are fixed, the contribution of the facet i to the function γ is the mutual information of the facet with the items. The algorithm then ranks the facets by their mutual information with the items based on a facet score as follows. The score of facet i is its mutual information with the items, given that the facet is in the first position (i.e., score (i)=I(X;F$_i$|μ(1)=i), which can be expanded as Equation (12);

$$I(X; F_i | \mu(1) = i) = \quad \text{Equation (12)}$$
$$\sum_x \sum_{j=0} (p(f_{ij}|p_{ij} = \mu_i^{-1}(j), \eta_{ij} = 1(\mu_i^{-1}(j) \leq \phi_i))p(x|f_{ij})$$
$$\log\left(\frac{p(x|f_{ij})}{p(x)}\right).$$

In Equation (12), $\rho_{ij}=\rho_i^{-1}(j)$ indicates that the global position of the facet value f$_{ij}$ is equal to its local position within facet i. This is because it is assumed that facet i is in the first position. Further, $\eta_{ij}=1(\mu_i^{-1}(j)\leq\phi_i)$ indicates that the facet value f$_{ij}$ is expanded if its rank within facet i is less than or equal to the cutoff for facet i (noting that the facet value rank and cutoff are assumed to be fixed). The facets are then ranked by the facet score; i.e., $\mu^{-1}(i)=\text{Rank}_i(\text{score}(i))$.

The facet cutoff (i.e., the number of facets to display on the webpage) may be set as the 99th percentile of the sum of the scores of all of the facets. For instance, if the sum of the scores of the first five facets is greater than 99 percent of the sum of the score of all facets, then the cutoff is set to 5 (i.e., ϕ=5).

The facet value ranking may be accomplished utilizing a sub-algorithm or module that is similar to the facet ranking sub-algorithm or module. The facet value ranking may be determined by assigning a score to the facet value. The score of the facet value is the contribution that the facet value makes to the mutual information determined by Equation (11) above. Assuming that the facet value is in the first position, the facet value score may be determined by Equation (13):

$$\text{score}(i, j) = \sum_x (p(f_{ij}|p_{ij}, \eta_{ij})p(x|f_{ij})\log\left(\frac{p(x|f_{ij})}{p(x)}\right). \quad \text{Equation (13)}$$

The facet values may then be ranked based on their score. The dynamic facet value expansion (i.e., cutoff) (which is accomplished during step 210 in FIG. 3) dynamically ranks facet values and chooses the facet values that are to be displayed on the webpage. The facet values that are not displayed are demoted to below the "see more" icon or button. The dynamic expansion algorithm can be obtained as follows. Assume that for facet i, the first ϕ$_i$=5 facet values are selected to be expanded and the remaining facet values are selected to be demoted below the "see more" button. For example, should ϕ$_i$=6 (i.e., the 6th facet value is displayed on the webpage (or page load) as well (noting that the facet value is f$_{ij}$; i.e., μ$_i$(6)=j), then the following events may occur. First, the facet value score of Score(i,j) in Equation (13) would increase, which would have a positive effect on Equation (11). This is due, at least in part, to the probability of engaging with that facet value increasing. Second, the scores of all the facets and facet values that are displayed under (i.e., ranked below) f$_{ij}$ decreases, because after expanding the facet value, all of the remaining facet values would move down. Accordingly, for each facet, the algorithm expands the number of facet values that maximizes Equation (11); i.e., for facet i∈{1, . . . , K}, the algorithm expands ϕ$_i$=n* number of facet values, where n* is a positive integer that solves the optimization problem, as defined by Equation (14):

$$n^* = \arg\max_n \Sigma_{i=1}^K I(F_i; X|\phi_i=n) \quad \text{Equation (14)}$$

The optimization problem can be solved exhaustively since ϕ$_i$ is expected to be less than 10 for all facets i. Typically, at most 10 facet values may be expanded on a single page load for a facet. Hence, the right side of Equation (14) can be calculated for ϕ$_i$=1, 2, etc.

In addition, for facets that have a logical order, the logical order above and below 'see more' are retained, i.e., the facet values are sorted with respect to their logical order, instead of the relevance score (Score(i,j)) in Equation (13). For instance, "shoe size" is a facet, whose values have a logical order, such as from smaller to larger (ranging from infants and kids sizes to adults sizes.). For a user query "womens' shoes", the kids and infants shoe sizes become irrelevant, and are demoted below the "see more" icon by the algorithm, e.g., sizes 5, 6, 7, . . . , 14 are displayed on page load in this logical order, and sizes smaller than 5 (including kids and infants shoe sizes) are demoted below the "see more" icon.

The method will now be illustrated with an example where the user is looking for an air conditioner, and the user enters the search query "air conditioner", as illustrated in FIGS. 4 and 5. FIGS. 4 and 5 are screenshots of a webpage including the LHN portion and the product display portion. FIG. 4 depicts the scenario where the algorithm of the method is active, and is referred to herein as the variation. FIG. 5 depicts the scenario where the facets and facet values are ranked only by click-through rate and the dynamic expansion sub-algorithm is not active, and is referred to herein as the control.

During the first stage of the algorithm, the probability of engaging with a facet value is estimated utilizing Equation (9). The estimation takes into account the facet value click history (click-through rate) and indirect signals, such as item-click engagement. Focusing on two facets, a "btu"

facet whose values contain the exact btu value of the air conditioners (e.g., 10150 btu) and a "btu_airconditioners" range facet whose values contain ranges (e.g., 9001-12000 btu), as depicted in FIGS. 4 and 5, respectively. It is assumed that the "btu_airconditioners" facet has been recently created to improve the LHN experience. However, to ensure backward compatibility, the "btu" facet is not removed. In this scenario, the facet values of 'btu_airconditioner' facet would not have any facet click history. According during control, the 'btu_airconditioner' facet would not be displayed. Also during control, to ensure that 'btu_airconditioner' facet is displayed instead of the 'btu' facet, manual overrides may be implemented, which would blacklist the facet 'btu' and whitelist the facet 'btu_airconditioner' for all search queries with the air conditioners as the dominant intent (e.g., 'air conditioner', 'air conditioners', 'LG air conditioner', 'portable air conditioners', etc.). However, manual overrides may not be scalable, which may be due to the number of query-facet pairs that are required to be overridden. Furthermore, during control, the 'btu' and 'btu_airconditioner' facets may appear together, which would not be an optimal user experience as these facets are very similar. In contrast, during variation (again, which applies the algorithm of the present method), estimation of the probability of 'btu_airconditioner' facet values would be positive. It is noted that when a new facet i is created, the item-facet mapping $\psi_i(x)$ is updated for all items x in the search index. Although the new facet does not have any clicks, items that are tagged to this new facet have click history, and for this reason, the estimation using Equation (9) is positive.

Also during the first stage, the probability of engaging with an item given the user has engaged with a particular facet value may be estimated using the item facet mappings ($\psi_i(x)$) and item click history using Equation (10).

Next, the query-categorization sub-algorithm or module is executed to clean up duplicate facets. Recalling that the facets "btu" and "btu_airconditioner" facets are duplicative, the query-categorization module selects the "btu_airconditioner" facet and removes the "btu" facet. This is accomplished as follows. First, for the user query "air conditioner", the module identifies that the category "Home Improvement->Heating, Cooling & Air Quality->Air conditioners" as the dominant category. Then, the module checks the list of facets tagged to the search query "air conditions", and identifies that the "btu" facet is not tagged to this category. The facet "btu" is then removed as being duplicative.

After duplicate facets have been removed, the facet ranking algorithm is executed (Equation (12)) assuming that the facet value ranking and dynamic expansion are fixed. Recall that Equation (12) ranks the facets according to their mutual information with the item that user intends to purchase. This measure takes into account i) the popularity of (probability of) choosing the facet value, and ii) how uniformly the facet values partition the search results. To illustrate, consider the facet 'product_weight' which contain the weight ranges as facet values (e.g., 30-45 kg, 45-60 kg, etc.). Even if the facet values partition the search results practically uniformly, the facet "product_weight" is not particularly critical to air conditioners (compared to type, price, btu, etc.), and would therefore have a low facet click-through rate and, in turn, a low facet value probability. Accordingly, the facet would be ranked lower in LHN portion of the webpage. On the other hand, consider the facet "product_category", which contains the facet values ("air conditioner", "remote controls", "heaters", etc.). Most users would engage with the facet value 'air conditioner' of facet 'product_category', and the probability of the facet "air conditioner" would be high. However, the facet "air conditioner" would not practically uniformly partition the search results, as almost all of the search results would be of type "air conditioner". Thus, selecting the facet value "air conditioner" would provide no additional information to the user (i.e., would not filter out any items). Therefore, the information that the facet "product_category" would bring is very low, and the facet would therefore be ranked lower. In this case, the facet "type" is ranked at the top position as users engage with its facet values very frequently, and the values of the facet (window, portable, etc.) practically uniformly splits the search results.

Then, the facet value ranking (Equation (14)), and dynamic expansion algorithms (Equation (14)) are executed. The facet value ranking algorithm ranks the facet values of each facet by relevance, and the dynamic expansion algorithm sets algorithmic cutoff for every facet. During control, seven facet values are displayed for every facet, which is an inefficient use of the LHN portion of the webpage. However, during variation, only relevant facet values (determined by Equation (14)) are displayed on the webpage and less-relevant facet values (e.g., facet value "Built in wall unit" of facet "type") is demoted below the "see more" icon. Recall that, a less relevant facet value means the probability estimate in Equation (8) is low, which would either mean i) users do not engage with the facet value, or ii) not enough relevant items are tagged to the facet value.

The above description of illustrated examples of the present disclosure, including what is described in the Abstract, are not intended to be exhaustive or to be limitation to the precise forms disclosed. While specific embodiments of, and examples for, the disclosure are described herein for illustrative purposes, various equivalent modifications are possible without departing from the broader spirit and scope of the present disclosure.

What is claimed is:

1. A system comprising:
a database for storing data pertaining to facets of products categorized in one or more product categories; and
a processor coupled to the database and configured to execute computer-readable instructions causing the processor to:
receive a search query for a product from a computing device of a user, wherein the search query comprises one or more search terms, the products comprise the product, and the product corresponds to the one or more product categories;
analyze a set of the facets and corresponding facet values using a multi-stage algorithm based on the one or more search terms, wherein the corresponding facet values are sub-categories of the facets of the set of the facets;
at a first stage of the multi-stage algorithm:
estimate a first probability of the user selecting a particular facet of a plurality of facets and a particular corresponding facet value of a plurality of facet values for a given search query, wherein:
the database uses product facet mapping to map the particular facet of the plurality of facets to a particular product categorized in the one or more product categories generating a plurality of product records comprising the facets and the facet values to be displayed to a graphical user interface for selection by the user;

receive a selection for the particular facet of the plurality of facets mapped to the plurality of product records and the facet values of the particular product;

estimate a second probability of the user selecting the particular product given the particular facet of the plurality of facets and a particular facet value of the plurality of facet values that have been selected; and filter the plurality of facets and the plurality of facet values to remove therefrom duplicate facets, duplicate facet values, irrelevant facets, irrelevant facet values, or combinations thereof to generate a final list of facets and a final list of facet values corresponding to the first probability and the second probability, as estimated;

at a second stage of the multi-stage algorithm, use a facet ranking algorithm to rank the final list of facets and the final list of facet values based on at least a probability of selecting the particular facet or the particular corresponding facet value of the particular product corresponding to the one or more product categories such that mutual information between the particular product and the plurality of facets and the plurality of facet values is maximized, wherein displaying the final list of facets comprises displaying the facet values associated with the facets;

responsive to receiving the final list of facets, establish a facet cut off point based on a predetermined threshold that denotes a number of the final list of facets to be displayed on the graphical user interface of the computing device of the user;

display a portion of the final list of facets and a portion of the final list of facet values ranked above the predetermined threshold comprising a dynamic expansion level;

compress an other portion of the final list of facets and the other portion of the final list of facet values ranked below the predetermined threshold comprising a dynamic demotion level that are not initially displayed on the graphical user interface until the user selects an interface on the graphical user interface revealing remaining facets in the dynamic demotion level; and establish a specific ordered arrangement of the final list of facets and the final list of facet values ranked above the predetermined threshold, wherein higher ranked ones of such facets are listed above lower ranked ones of such facets within the dynamic expansion level for display on the graphical user interface of the computing device of the user relevant to the search query.

2. The system as set forth in claim 1 wherein the data stored in the database includes session level data for a plurality of previous search queries, the session level data including i) recorded click through rates of the facet values as a function of a facet value global position, a facet value expansion, and a facet value demotion, and ii) recorded click through rates of items uncovered during a search.

3. The system as set forth in claim 2 wherein the computer-readable instructions causing the processor to estimate the first probability that the user selects the particular facet value includes computer-readable instructions causing the processor to utilize (a) the session level data stored in the database to rank previously existing facets and the facet values and (b) at least one indirect signal to rank newly created facets, newly created facet values, tail queries, and combinations thereof.

4. The system as set forth in claim 1 wherein the computer-readable instructions causing the processor to estimate the first probability includes computer-readable instructions causing the processor to estimate a fixed facet value position bias $\alpha_{ik}$ and a fixed facet value demotion bias $\beta_i$.

5. The system as set forth in claim 4 wherein the computer-readable instructions causing the processor to estimate the first probability further includes computer-readable instructions causing the processor to:

equate the first probability ($p(f_{ij}|\gamma)$) to a function $p(f_{ij}|\rho_{ij}, \eta_{ij})$, wherein $f_{ij}$ is a fact value of the facet values; i is a facet index, j is a facet value index; $\gamma$ is a set of ranking and cutoff functions including facet ranking $\mu$, a number of facets returned on a page load $\varphi$, and a set $\{\mu_i$ representing a facet value ranking, $\varphi_i$ representing a number of facet values expanded for facet i$\}$, $\rho_{ij}$ is a global position of the facet value $f_{ij}$; and $\eta_{ij}$ is an indicator of facet value $f_{ij}$ expanded on the page load; and estimate the first probability utilizing Equation (9):

$$p(f_{ij}|\rho_{ij}=k, \eta_{ij}=l) = \alpha_{ik}(\beta_i)^{1-i} \frac{ctr(f_{ij}|\rho_{ij}=1, \eta_{ij}=1)*imps(f_{ij}) + \sum_{x:f_{ij}\in\psi_i(x)} ctr(x)*imps(x)*\delta}{imps(f_{ij}) + \sum_{x:f_{ij}\in\psi_i(x)} imps(x)*\delta}$$

wherein: $\alpha_{ik}$, is the fixed facet value position bias; $\beta_i$ is the fixed facet value demotion bias; $\rho_{ij}$ is the global position of the facet value; $\eta_{ij}$ is the indicator that the facet value has been expanded on the page load; $\psi_i(x)$ is a faceting function which maps item x to the facet values of an item i; $imps(f_{ij})$ is a facet value impression; $ctr(f_{ij})$ is a click through rate of the facet value; $imps(x)$ is an item impression; and $ctr(x)$ is an item click through rate.

6. The system as set forth in claim 1 wherein the computer-readable instructions causing the processor to estimate the second probability comprises computer-readable instructions causing the processor to:

equate the second probability that the user selects the particular product record categorized in the one or more product categories when the user selects the particular facet value ($p(x|f_{ij},\gamma)$) with a function $p(x|f_{ij})$, wherein x is an item; $f_{ij}$ is a facet value of the facet values; and $\gamma$ is a set of ranking and cutoff functions including facet ranking $\mu$, a number of facets returned on a page load $\varphi$, and a set $\{\mu_i$ a facet value ranking, $\varphi_i$ a number of facet values expanded for facet i$\}$; and estimate the second probability the user selects the particular product record categorized in the one or more product categories when the user selects the particular facet value utilizing equation (10):

$$p(x|f_{ij}) = \begin{cases} \xi*ctr(x), & \text{if } f_{ij} \in \psi_i(x) \\ 0, & \text{otherwise} \end{cases}$$

wherein: x is the item; ctr(x) is an item click through rate; fij is the facet value of the facet values; and ψi(x) is a faceting function which maps item x to the facet values of the item i.

7. The system as set forth in claim 1 wherein the computer-readable instructions causing the processor to filter the plurality of facets and the plurality of facet values comprises computer-readable instructions causing the processor to:
   identify the duplicate facets and the duplicate facet values having the first probability and the second probability that are estimated to be positive;
   locate a dominant category identification for the search query; and
   utilize white and black lists from a browse shelf to select certain ones of the final list of facets and the final list of facet values that comprise the dynamic expansion level are displayed on the graphical user interface.

8. The system as set forth in claim 7 wherein the certain ones of the final list of facets and the final list of facet values set forth in the browse shelf are tagged to the dominant category identification.

9. The system as set forth in claim 1 wherein the computer-readable instructions causing the processor to rank a final list of the plurality of facets comprises computer-readable instructions causing the processor to optimize a function γ expressed by Equation (11):

$$\gamma^* = \underset{\gamma}{\operatorname{argmax}} I(X; F_1, \ldots, F_K | \gamma) \qquad (11)$$

wherein I is the facet value, X is the item, F is a facet value engagement, and K is a global position of the facet value.

10. The system as set forth in claim 1 wherein the computer-readable instructions causing the processor to rank a final list of the plurality of facets comprises computer-readable instructions causing the processor to:
   assign a score to each of the final list of the plurality of facets and each of a final list of the plurality of facet values;
      order the final list of the plurality of facets and the final list of the plurality of facet values based on an assigned score; and
   display a number of the final list of the plurality of facets and a number of the final list of the plurality of facet values having a score above a cutoff.

11. A method utilizing a processor executing computer-readable instructions of a computer program, and the method comprising:
   receiving, with a computer system, a search query for a product from a computing device of a user, wherein the search query comprises one or more search terms, products comprise the product, and the product corresponds to one or more product categories;
   analyzing, with the computer system, a set of facets and corresponding facet values using a multi-stage algorithm based on the one or more search terms, wherein the corresponding facet values are sub-categories of facets of the set of the facets;
   at a first stage of the multi-stage algorithm:
      estimating, with the computer system, a first probability of the user selecting a particular facet of a plurality of facets and a particular corresponding facet value of a plurality of facet values of the plurality of facet values given search query; wherein:
         the database uses product facet mapping to map the particular facet of the plurality of facets to a particular product categorized in the one or more product categories generating a plurality of product records comprising the facets and the facet values to be displayed to a graphical user interface for selection by the user;
      receive a selection for the particular facet of the plurality of facets mapped to the plurality of product records of the facet values of the particular product;
      estimating a second probability of the user selecting the particular product given the particular facet of the plurality of facets and a particular facet value of the plurality of facet values that have been selected; and
      filtering the plurality of facets and the plurality of facet values to remove therefrom duplicate facets, duplicate facet values, irrelevant facets, irrelevant facet values, or combinations thereof to generate a final list of facets and a final list of facet values corresponding to the first and second probabilities, as estimated;
   at a second stage of the multi-stage algorithm, use a facet ranking algorithm to ranking the final list of facets and a final list of the plurality of facet values based on at least a probability of selecting the particular facet or the particular corresponding facet value of the product corresponding to the one or more product categories such that mutual information between the particular product and the plurality of facets and the plurality of facet values is maximized, wherein displaying the final list of facets comprises displaying the plurality of facet values associated with the facets;
   responsive to receiving the final list of facets, establishing a facet cut off point based on a predetermined threshold that denotes a number of the final list of facets to be displayed on the graphical user interface of the computing device of the user;
   displaying on the graphical user interface, a portion of the final list of facets and a portion of the final list of facet values ranked above the predetermined threshold comprising a dynamic expansion level;
   compressing an other portion of the final list of facets and the other portion of the final list of facet values ranked below the predetermined threshold comprising a dynamic demotion level that are not initially displayed on the graphical user interface until the user selects an interface on the graphical user interface revealing remaining facets in the dynamic demotion level; and
   establishing a specific ordered arrangement of the final list of facets and final list of facet values ranked above the predetermined threshold, wherein the higher ranked ones of such facets are listed above lower ranked ones of such facets within the dynamic expansion level for display on the graphical user interface of the computing device of the user relevant to the search query.

12. The method as set forth in claim 11 wherein prior estimating the first probability and estimating the second probability, the method further comprises collecting session level data for a plurality of previous search queries, the session level data including i) recorded click through rates of the facet values as a function of a facet value global position, a facet value expansion, and a facet value demotion, and ii) recorded click through rates of items uncovered during a search.

13. The method as set forth in claim 12 wherein estimating the first probability that the user selects the particular facet value comprises utilizing (a) the session level data to rank previously existing facets and the facet values and (b) at least one indirect signal to rank newly created facets, newly created facet values, tail queries, and combinations thereof.

14. The method as set forth in claim 11 wherein estimating the first probability comprises estimating a fixed facet value position bias $\alpha_{ik}$ and a fixed facet value demotion bias $\beta_i$.

15. The method as set forth in claim 14 wherein estimating the first probability comprises:
equating the first probability (p(fij|γ)) to the function p(fij|ρij, ηij), wherein fij a facet value of the facet values; i is a facet index, j is a facet value index; γ is a set of ranking and cutoff functions including facet ranking μ, a number of facets returned on a page load φ, and a set μi representing a facet value ranking, φi representing a number of facet values expanded for facet i, ρij is a global position of the facet value $f_{ij}$; and $\eta_{ij}$ is an indicator of facet value $f_{ij}$ expanded on the page load; and
estimating the first probability utilizing Equation (9):

$$p(f_{ij}|\rho_{ij}=k, \eta_{ij}=l) = \alpha_{ik}(\beta_i)^{1-l} \frac{ctr(f_{ij}|\rho_{ij}=1, \eta_{ij}=1)*imps(f_{ij}) + \sum_{x:f_{ij}\in\psi_i(x)} ctr(x)*imps(x)*\delta}{imps(f_{ij}) + \sum_{x:f_{ij}\in\psi_i(x)} imps(x)*\delta}$$

wherein: $\alpha ik$ is the fixed facet value position bias; $\beta i$ is the fixed facet value demotion bias; fij is the facet value of the facet values; ρij is the global position of the facet value; ηij is the indicator that facet value is expanded on the page load; $\psi i(x)$ is a faceting function which maps item x to the facet values of the item i; imps(fij) is a facet value impression; ctr(fij) is a click through rate of the facet value; imps(x) is an item impression; and ctr(x) is an item click through rate.

16. The method as set forth in claim 11 wherein estimating the second probability that the user selects a particular product record categorized in the one or more product categories when the user selects the particular facet value further comprises:
equating the second probability that the user selects the particular product record categorized in the one or more product categories when the user selects the particular facet value $(p(x|f_{ij}, \gamma))$ with a function $p(x|f_{ij})$, wherein x is an item; $f_{ij}$ is a facet value of the facet values; and γ is a set of ranking and cutoff functions including facet ranking μ, a number of facets returned on a page load φ, and a set $\mu_i$, the facet value ranking, $\varphi_i$ a number of facet values expanded for facet i; and
estimating the second probability the user selects the particular product record categorized in the one or more product categories when the user selects the particular facet value utilizing equation (10):

$$p(x|f_{ij}) = \begin{cases} \xi ctr(x), & \text{if } f_{ij} \in \psi_i(x) \\ 0, & \text{otherwise} \end{cases}$$

wherein: x is the item; ctr(x) is an item click through rate; fij is the facet value of the facet values; and $\psi i(x)$ is a faceting function which maps item x to the facet values of the item i.

17. The method as set forth in claim 11 wherein filtering the plurality of facets and the plurality of facet values comprises:
identifying duplicate facets and duplicate facet values having the first probability and the second probability that are estimated to be positive;
locating a dominant category identification for the search query; and
utilizing white and black lists from a browse shelf to select certain ones of the final list of facets and the final list of facet values that comprise the dynamic expansion level are displayed on the graphical user interface.

18. The method as set forth in claim 11 wherein a final list of the plurality of facets comprises optimizing a function γ expressed by Equation (11):

$$\gamma^* = \underset{\gamma}{\mathrm{argmax}}\, I(X; F_1, \ldots, F_K|\gamma)$$

wherein I is a facet value, X is a item, F is a facet value engagement, and K is a global position of a facet value.

19. The method as set forth in claim 11, wherein ranking a final list of the plurality of facets comprises:
assigning a score to each of the final list of the plurality of facets and each of the final list of the plurality of facet values;
ordering the final list of the plurality of facets and the final list of the plurality of facet values based on an assigned score; and
displaying a number of the final list of the plurality of facets and a number of the final list of the plurality of facet values having a score above a cutoff.

20. One or more non-transitory computer-readable storage media having computer-executable instructions embodied thereon and, when executed by a processor, causes the processor to:
receive a search query for a product from a computing device of a user, wherein the search query comprises one or more search terms, products comprise the product, and the product corresponds to one or more product categories;
analyze a set of facets and corresponding facet values using a multi-stage algorithm based on the one or more search terms, wherein the corresponding facet values are sub-categories of facets of the set of the facets;
at a first stage of the multi-stage algorithm:
estimate a first probability of the user selecting a particular facet of a plurality of facets and a particular corresponding facet value of a plurality of facet values for a given search query, wherein:
the database uses product facet mapping to map the particular facet of the plurality of facets to a particular product categorized in one or more product categories generating a plurality of product records comprising the facets and the facet values to be displayed to a graphical user interface for selection by the user;
receive a selection for the particular facet of the plurality of facets mapped to the plurality of product records and the facet values of the particular product;
estimate a second probability of the user selecting the particular product given the particular facet of the plurality of facets and a particular facet value of the plurality of facet values that have been selected; and filter the plurality of facets and the plurality of facet values to remove therefrom duplicate facets, duplicate facet values, irrelevant facets, irrelevant facet values, or combinations thereof to generate a final list of facets and a final list of facet values corresponding to the first probability and the second probability, as estimated;

at a second stage of the multi-stage algorithm, use a facet ranking algorithm to rank the final list of facets and the final list of facet values based on at least a probability of selecting the particular facet or the particular corresponding facet value of the particular product corresponding to the one or more product categories such that mutual information between the particular product and the plurality of facets and the plurality of facet values is maximized, wherein displaying the final list of facets comprises displaying the final list of facet values;

responsive to receiving the final list of facets, establish a facet cut off point based on a predetermined threshold that denotes a number of the final list of facets to be displayed on the graphical user interface of the computing device of the user;

display on the graphical user interface, a portion of the final list of facets and a portion of the final list of facet values ranked above the predetermined threshold comprising a dynamic expansion level; and compress an other final list of facets and an other final list of facet values ranked below the predetermined threshold comprising a dynamic demotion level, wherein the other final list of facets are not initially displayed on the graphical user interface until the user selects an interface on the graphical user interface remaining facets in the dynamic demotion level; and establish a specific ordered arrangement of the final list of facets and the final list of facet values ranked above the predetermined threshold, wherein higher ranked ones of such facets are listed above lower ranked ones of such facets within the dynamic expansion level for display on the graphical user interface of the computing device of the user relevant to the search query.

\* \* \* \* \*